United States Patent
Kiest, Jr.

(10) Patent No.: US 9,506,596 B2
(45) Date of Patent: Nov. 29, 2016

(54) APPARATUS AND METHOD FOR REPAIRING THE JUNCTION OF A SEWER MAIN AND LATERAL PIPE

(75) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 764 days.

(21) Appl. No.: 13/208,493

(22) Filed: Aug. 12, 2011

(65) Prior Publication Data

US 2012/0084956 A1 Apr. 12, 2012

Related U.S. Application Data

(60) Provisional application No. 61/390,432, filed on Oct. 6, 2010.

(51) Int. Cl.
*E03F 3/06* (2006.01)
*F16L 55/165* (2006.01)
(Continued)

(52) U.S. Cl.
CPC ........ *F16L 55/1651* (2013.01); *F16L 55/1654* (2013.01); *F16L 55/179* (2013.01);
(Continued)

(58) Field of Classification Search
CPC ............. B23P 6/00; B23P 6/04; B23P 11/02; B23P 11/022; F16L 55/165; F16L 55/1651; F16L 55/164; F16L 55/179; B29C 63/36; E03F 2003/065; Y10T 29/49719; Y10T 29/49721; Y10T 29/49734; Y10T 29/49885; Y10T 29/49888; Y10T 29/49718; Y10T 29/49732; Y10T 29/49742; Y10T 29/49826
USPC ........... 29/402.09, 402.01, 402.02, 460, 458; 137/15.01, 15.09, 317, 318, 315.01; 138/97, 98; 405/150.1, 184.1, 184.2
See application file for complete search history.

(56) References Cited

U.S. PATENT DOCUMENTS 5,329,063 A * 7/1994 Endoh ............................ 138/98
5,393,481 A * 2/1995 Wood ............................ 264/516
(Continued)

FOREIGN PATENT DOCUMENTS

DE 4207037 9/1993
EP 2151617 A1 * 2/2010 ............ F16L 55/179
(Continued)

OTHER PUBLICATIONS

International Search Report for International (PCT) Patent Application No. PCT/US2011/055066, mailed Mar. 16, 2012.

*Primary Examiner* — David Bryant
*Assistant Examiner* — Bayan Salone
(74) *Attorney, Agent, or Firm* — Nyemaster Goode, P.C.

(57) ABSTRACT

The present invention is an improved method and assembly for repairing a pipe or the junction of two pipes, such as sewer pipes. The assembly includes a launcher device having a launcher device body, a launcher device opening disposed on the launcher device body, and a main bladder substantially surrounding the launcher device body. The main bladder includes an opening that substantially aligns with the launcher device opening. The assembly further includes an absorbent liner and a lateral bladder having a tubular lateral bladder body portion and a flange portion. The flange portion of the lateral bladder is attached to the exterior of the launcher device body. A method of using the assembly includes impregnating the liner with resinous material; inserting at least a portion of the liner into the lateral bladder; inflating the bladders; pressing the liner against the pipe; and allowing the resinous material to cure and harden.

24 Claims, 8 Drawing Sheets

(51) Int. Cl.
   *F16L 55/179*   (2006.01)
   *B23P 11/02*    (2006.01)
   *B23P 6/04*     (2006.01)
   *B29C 63/36*    (2006.01)
   *B23P 6/00*     (2006.01)

(52) U.S. Cl.
   CPC ......... *B29C 63/36* (2013.01); *E03F 2003/065* (2013.01); *Y10T 29/49718* (2015.01); *Y10T 29/49719* (2015.01); *Y10T 29/49732* (2015.01); *Y10T 29/49742* (2015.01); *Y10T 29/49826* (2015.01); *Y10T 29/49885* (2015.01); *Y10T 29/49888* (2015.01)

(56) References Cited

U.S. PATENT DOCUMENTS

| | | | | |
|---|---|---|---|---|
| 5,439,033 | A * | 8/1995 | Kamiyama et al. | 138/98 |
| 5,498,389 | A * | 3/1996 | Kamiyama et al. | 264/516 |
| 5,566,719 | A * | 10/1996 | Kamiyama et al. | 138/98 |
| 5,915,419 | A * | 6/1999 | Tweedie et al. | 138/98 |
| 5,950,682 | A * | 9/1999 | Kiest, Jr. | 138/98 |
| 5,964,249 | A | 10/1999 | Kiest | |
| 6,001,212 | A * | 12/1999 | Polivka et al. | 156/287 |
| 6,029,726 | A * | 2/2000 | Tweedie et al. | 156/423 |
| 6,039,079 | A * | 3/2000 | Kiest, Jr. | 138/98 |
| 6,068,725 | A * | 5/2000 | Tweedie et al. | 156/287 |
| 6,688,337 | B2 * | 2/2004 | Ward | 138/98 |
| 6,994,118 | B2 * | 2/2006 | Kiest et al. | 138/98 |
| 7,311,121 | B2 * | 12/2007 | Kamiyama et al. | 138/98 |
| 7,628,177 | B2 * | 12/2009 | Lepola | 138/98 |
| 7,631,665 | B2 * | 12/2009 | Muhlin | 138/98 |
| 7,975,726 | B2 * | 7/2011 | Kiest, Jr. | 138/98 |
| 7,987,873 | B2 * | 8/2011 | Kiest, Jr. | 138/98 |
| 8,375,972 | B2 * | 2/2013 | Kiest, Jr. | 137/15.09 |
| 8,550,121 | B2 * | 10/2013 | Kiest, Jr. | 138/98 |
| 8,667,991 | B2 * | 3/2014 | Kiest, Jr. | 138/98 |
| 8,667,992 | B2 * | 3/2014 | Kiest, Jr. | 138/98 |
| 8,678,037 | B2 * | 3/2014 | Kiest, Jr. | 138/98 |
| 8,689,835 | B2 * | 4/2014 | Kiest, Jr. | 138/98 |
| 8,739,809 | B2 * | 6/2014 | Kiest, Jr. | 137/15.09 |
| 8,752,589 | B2 * | 6/2014 | Kiest, Jr. | 138/98 |
| 8,807,172 | B2 * | 8/2014 | D'Hulster et al. | 138/98 |
| 8,857,025 | B2 * | 10/2014 | Kiest, Jr. | 29/402.01 |
| 8,869,839 | B1 * | 10/2014 | D'Hulster | F16L 55/1651 138/97 |
| 2003/0116211 | A1 * | 6/2003 | Ward | 138/98 |
| 2005/0121092 | A1 * | 6/2005 | Kiest et al. | 138/98 |
| 2006/0130923 | A1 * | 6/2006 | Lepola et al. | 138/98 |
| 2007/0261222 | A1 * | 11/2007 | Lepola | 29/402.01 |
| 2008/0029177 | A1 * | 2/2008 | Kamiyama et al. | 138/98 |
| 2008/0169036 | A1 * | 7/2008 | Kamiyama et al. | 138/98 |
| 2008/0245433 | A1 * | 10/2008 | Warren | 138/98 |
| 2009/0056823 | A1 * | 3/2009 | Kiest, Jr. | 138/98 |
| 2009/0095355 | A1 * | 4/2009 | Kiest, Jr. | 137/15.01 |
| 2009/0194184 | A1 | 8/2009 | Kiest | |
| 2011/0203719 | A1 * | 8/2011 | Kiest, Jr. | 156/94 |
| 2011/0259461 | A1 * | 10/2011 | Kiest, Jr. | 138/97 |
| 2011/0277864 | A1 * | 11/2011 | Kiest, Jr. | 138/98 |
| 2012/0084957 | A1 * | 4/2012 | Kiest, Jr. | 29/402.16 |
| 2013/0019983 | A1 * | 1/2013 | Kiest, Jr. | 138/98 |
| 2013/0112303 | A1 * | 5/2013 | Kiest, Jr. | 138/97 |
| 2013/0199652 | A1 * | 8/2013 | Kiest, Jr. | 138/97 |
| 2013/0213513 | A1 * | 8/2013 | Kiest, Jr. | 138/98 |
| 2013/0249208 | A1 * | 9/2013 | Kiest, Jr. | 285/55 |
| 2014/0102576 | A1 * | 4/2014 | Kiest, Jr. | 138/98 |
| 2014/0102577 | A1 * | 4/2014 | Kiest, Jr. | 138/98 |
| 2014/0158243 | A1 * | 6/2014 | Kiest, Jr. | 138/97 |

FOREIGN PATENT DOCUMENTS

| | | |
|---|---|---|
| EP | 2208920 A1 * | 7/2010 |
| WO | 2009/052133 | 4/2009 |

* cited by examiner

APPARATUS AND METHOD FOR REPAIRING THE JUNCTION OF A SEWER MAIN AND LATERAL PIPE

CROSS-REFERENCE TO RELATED APPLICATIONS

This application claims priority under 35 U.S.C. §119 of a provisional application Ser. No. 61/390,432 filed Oct. 6, 2010, and which application is hereby incorporated by reference in its entirety.

FIELD OF THE INVENTION

The invention relates generally to sewer pipe repair. More particularly, but not exclusively, the invention relates to an improved method and apparatus for repairing the junction of a main and lateral pipe.

BACKGROUND OF THE INVENTION

One method of repairing a damaged sewer pipe is known as cured-in-place pipelining (CIPP). CIPP involves using a lining assembly including a main bladder, a lateral bladder tube extending from the main bladder, and a lateral liner tube. The lateral bladder tube may be separate from the main bladder to accommodate instances when a different diameter of lateral pipe needs repaired. Such a liner assembly and a method of use are disclosed in U.S. Pat. No. 5,950,682, which is owned by the applicant and hereby incorporated by reference in its entirety (and attached as Appendix A).

However, problems exist with such methods and apparatus. Because the lateral bladder tube extends from the main bladder, the two bladders must be inflated at the same time in some embodiments. This increases the internal pressure on the connection between the main and lateral bladder. If the seal is not tight, a leak may form. The leak makes it difficult to fully inflate the bladders to press the lateral liner and liner collar against the wall of the lateral pipe and the junction between the main and lateral pipe. When this pressure is not great enough, the liner will not cure properly. There may be folds in the liner, or the liner may cure away from the wall of the pipe. If folds are formed, they would have to be cut or sanded out. If the liner cures away from the wall, it would have to be redone. In either case, it would be both expensive and time consuming to fix the problem of the liner assembly not inflating properly.

A separate problem exists with methods and apparatus that include independent main and lateral bladders. In those embodiments, the means of connecting the bladders to a launcher interferes with the process of installing a cured-in-place liner. Specifically, the lateral or auxiliary bladder disclosed in U.S. Pat. No. 5,950,682 is attached to the interior of a rim protruding from a launcher device. Such an attachment can create voids between the launcher device and the bladders, allowing resin to interact with the launcher device. This increases clean up time and potentially damages the launcher device. Therefore, there is a need in the art for an improved or alternative method and apparatus for repairing the junction of a main and lateral pipe that incorporates the use of a separate main and lateral bladder to expand to press a lateral liner tube and/or a main line liner member against the wall of a lateral pipe and the junction of a main and lateral pipe.

There is also a need in the art for a method and apparatus for repairing the junction of a main and lateral pipe that is easily changeable at a job site to account for varying diameters of pipes. A limitation of U.S. Pat. No. 5,950,682 is that the opening of the launcher device must be substantially the same diameter as the lateral bladder. This limitation may be unnecessary, due to the fact that many different diameters of lateral pipes may be used in sewer systems. Therefore, a separate launcher would be required to repair a sewer system having lateral pipes of varying diameters. It can be both expensive and time consuming to provide separate launchers to repair different pipes within the same sewer system.

Lastly, there is a need in the art for a method and apparatus for repairing the junction of a main and lateral pipe that includes a fully reusable lateral bladder. Known methods employ pushing a liner into a lateral bladder using a rod, which requires an end of the lateral bladder to be open, in order to string the liner along the lateral bladder. The open end of the bladder is then closed for the inversion process. The bladder may be discarded after the inversion and curing process. If an attempt to reuse the bladder was to be made, such a reuse can be impractical and inconvenient. Because the end of the lateral bladder must be open during placement of the liner, the lateral bladder must be cut after a first use to place a second liner within the lateral bladder. This must be done in order to gain access to the interior of the bladder. The cutting makes the lateral bladder shorter. After placing a second liner within the lateral bladder, the bladder must be reclosed, using even more bladder material to make the seal. For many applications, the loss of such a bladder length would make reuse of the bladder impractical, as the bladder is unfit for pipe repair lengths equal to or greater than the first pipe repair. Furthermore, the process of cutting the lateral bladder and reclosing it is a time intensive process. Therefore, there is a need in the art for an improved or alternative method and apparatus for repairing the junction of a main and lateral pipe that incorporates the use of a fully reusable lateral bladder that is configured for rapid reuse.

SUMMARY OF THE INVENTION

It is therefore a primary object, feature, and/or advantage of the present invention to provide an improved or alternative method and means for repairing the junction of a main and lateral pipe that overcomes problems, issues, or deficiencies in the art.

It is another object, feature, and/or advantage of the present invention to provide an improved or alternative method and means for repairing the junction of a main and lateral pipe that incorporates the use of separate main and lateral bladders.

It is another object, feature, and/or advantage of the present invention to provide an improved or alternative method and apparatus that includes a lateral bladder being attached directly to a launcher device, providing independent inflation between the main bladder and the lateral bladder.

It is another object, feature, and/or advantage of the present invention to provide a method and apparatus for repairing the junction of a main and lateral pipe that is field changeable.

It is another object, feature, and/or advantage of the present invention to provide a liner assembly that is able to repair pipes having varying diameters.

It is another object, feature, and/or advantage of the present invention to provide a method and apparatus of repairing a junction of a main and lateral pipe that is customizable at the job site.

It is another object, feature, and/or advantage of the present invention to provide an assembly and methods that include a bladder that may be used a plurality of times to install a plurality of liners while the end of the bladder remains substantially closed.

These and/or other objects, features, and advantages of the present invention will be apparent to those skilled in the art. The present invention is not to be limited to or by these objects, features and advantages, and no single embodiment need exhibit every object, feature, and/or advantage.

DETAILED DESCRIPTION OF EXEMPLARY EMBODIMENTS OF THE INVENTION

Figure 1:
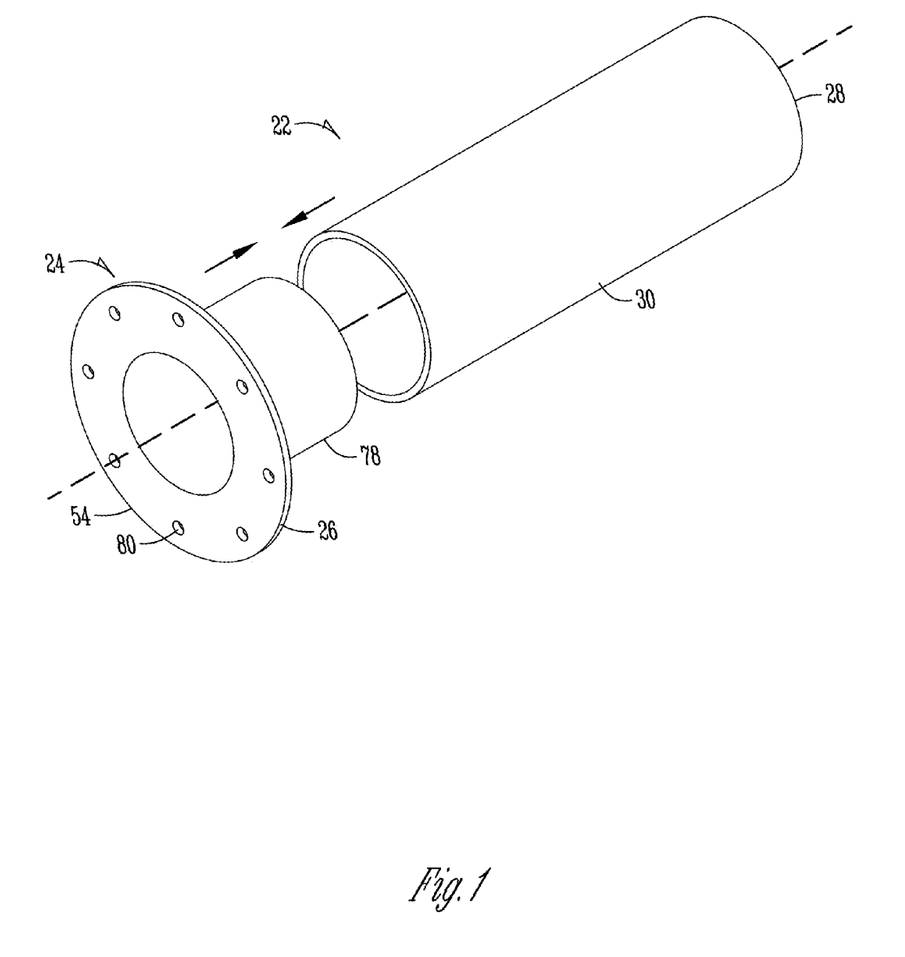
FIG. 1 is a perspective view of the lateral bladder used with embodiments of the present invention.

FIG. 1 is a perspective view of a lateral bladder 22 used with embodiments of the present invention. The present invention allows a bladder to be field changeable, reusable, and/or custom made on the job site. As shown in FIG. 1, the embodiment comprises a first end 24 comprising a lateral connect 26, a second lateral end 28 and a lateral bladder body 30 there between. The lateral bladder body 30 may be made from a roll of bulk bladder material that is cut to length and diameter. For example, a lateral pipe may be measured to be 4" in diameter and an area of repair measured to be 39' 7" in length. The lateral bladder body 30 may be cut from a bulk material from a bulk roll of 4" diameter material to get the 39' 7" length needed.

Next, the lateral bladder body 30 is connected to the lateral connect 26, to form the lateral bladder 22. The lateral connect 26 is generally a hat shaped bladder piece. The lateral connect 26 may consist of a flange portion 54 and a tubular portion 78 extending from the flange portion 54. Flange portion 54 and tubular portion 78 of the lateral connect 26 can be constructed of the same material, and can be the bladder material used for the bladder body 30. Some materials that may be used for the lateral connect 26 may include PVC, polyethylene, polypropylene, polyurethane, or any other material capable of being used as bladder material. Alternatively, the flange portion 54 and tubular portion 78 may be made of different materials. For instance, the flange portion 54 could be made of a PVC material and could be fused to the tubular portion 78, constructed of another bladder material such as polyethylene. Many materials are contemplated for the lateral connect 26, as long as the material is compatible with or capable of being attached to the bladder body 30. It should be noted that the lateral bladder depicted in FIG. 1 is for an embodiment of the invention that can be rapidly prepared in the field. In other embodiments, the lateral bladder 22 may be formed at a remote location by heat welding bladder material together to form a lateral bladder comprising a tubular body portion and a flange portion.

In attaching the lateral bladder body 30 to the lateral connect 26, the tubular portion 78 is generally the same diameter as the diameter of the bladder body 30 previously cut to length. In addition, the flange portion 54 of the lateral connect 26 may include a plurality of holes 80 for connecting to a launcher device, as will be discussed in greater detail below. To fit the lateral connect 26 to the bladder body 30 to form a lateral bladder 22, the tubular portion 78 of the lateral connect 26 is inserted within the lateral bladder body 30. A glue or solvent is added around the periphery of the tubular portion 78 of the lateral connect 26 before it is inserted into the lateral bladder body 30. Next, a pneumatic plug (not shown) or the like is inserted through the lateral connect 26 adjacent the tubular portion 78 of the lateral connect 26 within the lateral bladder body 30. The portion of the lateral bladder body 30 and lateral connect 26 to be fused is optionally placed within a rigid tube, the pneumatic plug is inflated, and the pressure is maintained within the pneumatic plug to allow the lateral connect 26 to bond to the lateral bladder body 30. This bonding process also acts to smooth out wrinkles which may occur when the tubular portion 78 of the lateral connect 26 is inserted into the lateral bladder body 30. The pneumatic plug remains inflated until the glue or solvent material between the tubular portion 78 of the lateral connect 26 and the lateral bladder body 30 has bonded the two members to form the lateral bladder 22. The lateral bladder 22 is then attached to a launcher device.

Figure 2A:
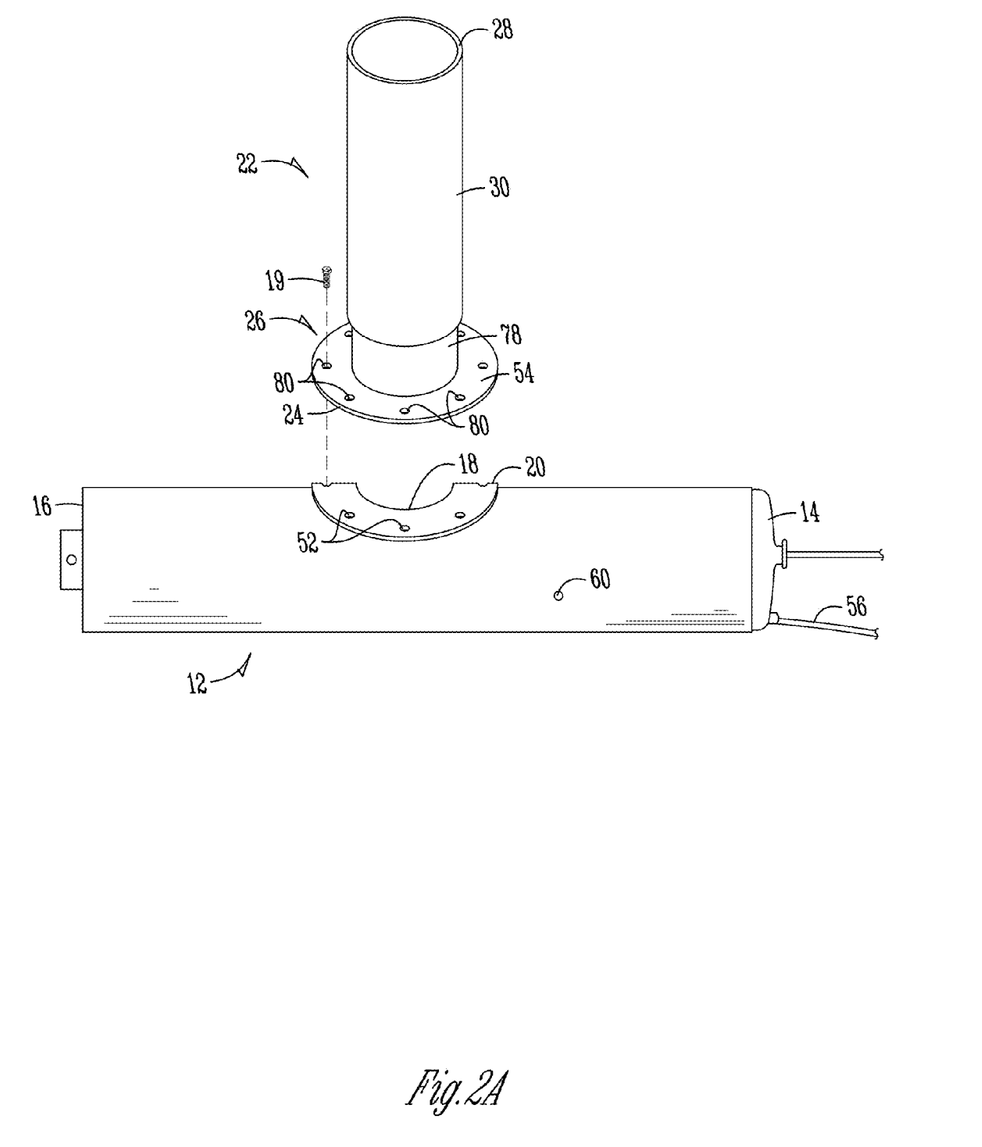
FIG. 2a is a perspective view of the lateral bladder before attachment to a launcher device.
Figure 2B:
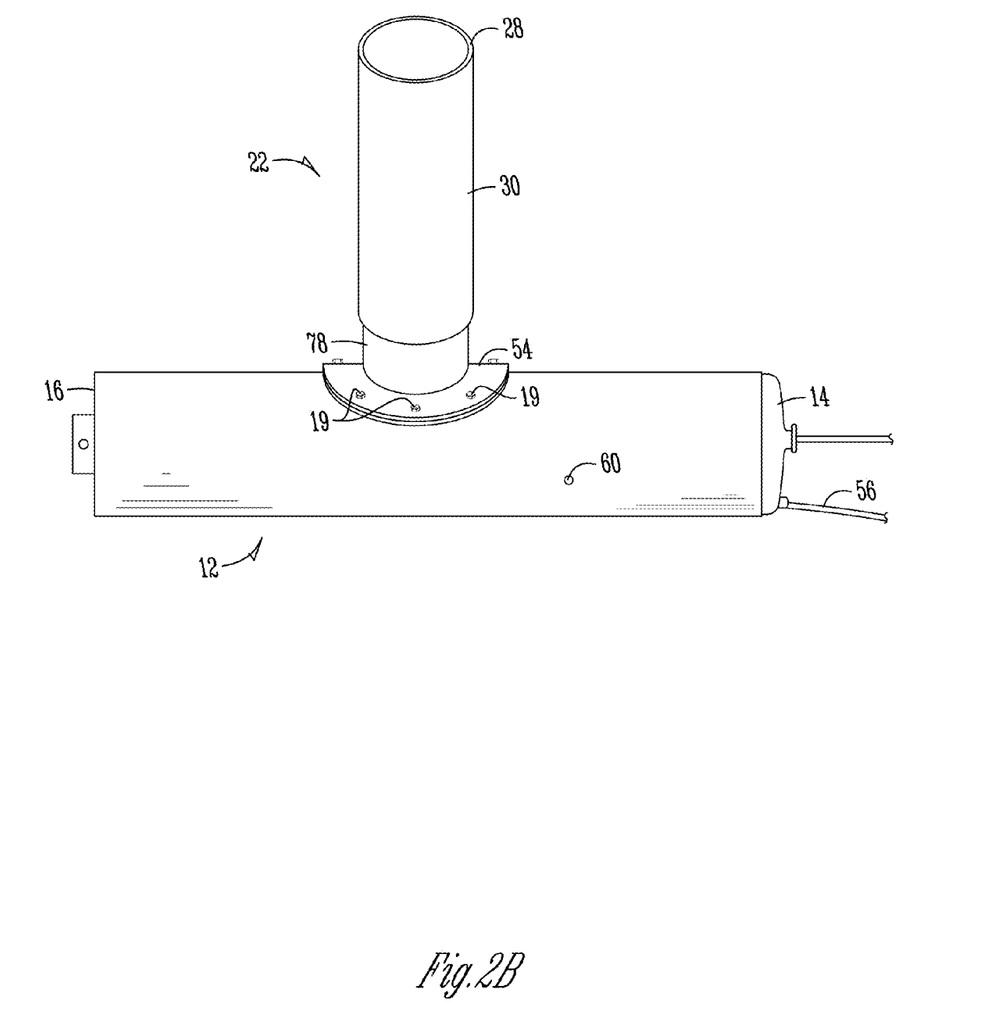
FIG. 2b is a perspective view of the lateral bladder attached to the launcher device.

FIGS. 2a and 2b illustrate the connection of the lateral bladder 22 to a launcher device 12. The launcher device 12 is a pipe or other member that is used to transport the bladders and liner to a position within a pipe. The launcher device 12 may generally comprise an open end 14, a closed end 16, and an opening 18 there between. The launcher device 12 may include a ramped interior that may act to hold the lateral bladder 22. Further, the launcher device 12 may optionally include a collar 20. The collar 20 includes a plurality of holes 52 corresponding to the holes 80 of the flange portion of the lateral connect 26. Therefore, the lateral bladder 22 may be connected directly to the launcher device 12 via the lateral connect 26 and the collar 20. The collar 20 may also include a protruding rim (not shown) to support the lateral connect 26 of the lateral bladder 22. Such an embodiment would be effective with the lateral bladder body 30, because the protruding rim would provide a portion of the launcher device 12 to act as point of attachment for the lateral bladder body 30 in addition to providing structural support. For example, tubular portion 78 of the lateral connect 26 may be placed over the protruding rim, a band or clamp may be applied to the outside of the lateral connect 26, and the flange portion 54 may be folded upward and taped to the clamp or band. Such an embodiment is discussed further in relation to FIGS. 9-11. Alternatively, another structural point of attachment for the lateral bladder 22 may be the open end 14 of the launcher device 12. In such an alternative embodiment, the first end 24 of the lateral bladder 30 is attached to a rim of the open end 14 of the launcher device 12 instead of the collar 20. The flange portion 54 of the lateral connect 26 may be folded over the rim and secured to the outer surface of the launcher device 12.

The embodiment of FIGS. 2a and 2b show where the lateral bladder 22 and launcher device 12 are connected by the use of bolts 19 are inserted through the holes 80 in the flange portion 54 of the lateral connect 26 and into threaded holes 52 on the collar 20 of the launcher device 12. Alternatively, the flange portion 54 of the lateral connect 26 may be connected to the launcher device 12 by use of a glue or solvent between the flange portion 54 and the launcher device 12. In certain embodiments, a retaining ring and a gasket (not shown) may be used to secure the flange portion 54 to the launcher device collar 20. A gasket would be used for instances when a seal between the lateral bladder 22 and the launcher device 12 is desired. It should be noted that a seal between the lateral bladder 22 and launcher device 12 is not required to practice this invention, because in operation, a main bladder 32 may be inflated first, covering the lateral connect portion 26 of the lateral bladder tube 22, sealing it against the launcher device 12.

Figure 3:
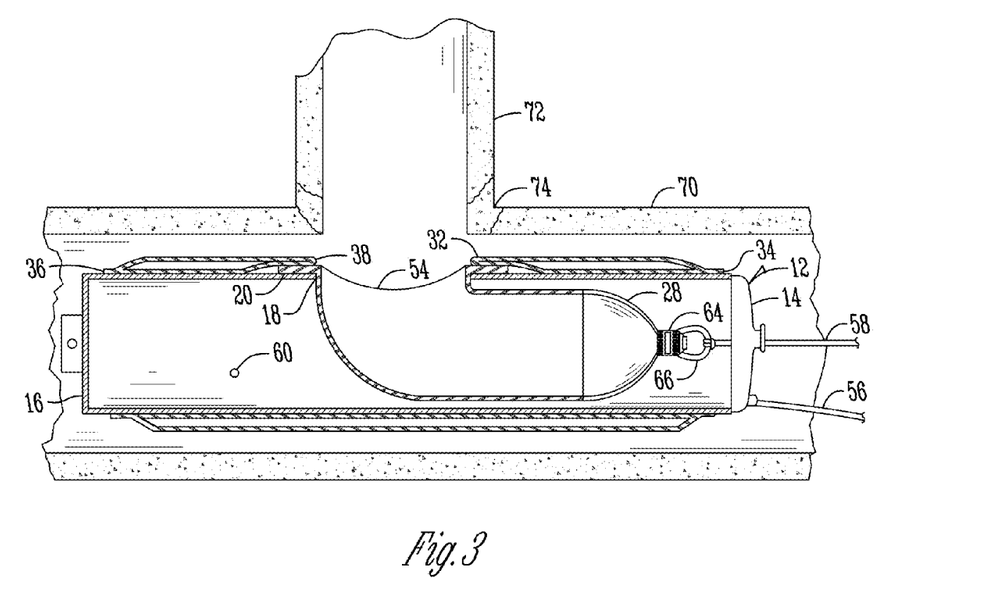
FIG. 3 is a sectional view of the launcher device, lateral bladder, and main bladder used with embodiments of the present invention at a junction between a main and lateral pipe.

FIG. 3 is a sectional view of a launcher device 12, lateral bladder 22, and main bladder 32 used with the present invention located at a junction 74 between a main pipe 70 and a lateral pipe 72. The lateral bladder 22 is inverted through the opening 18 of the launcher device 12 either before or after attachment to the launcher device 12. The second end 28 of the lateral bladder 22 is closed by a band or clamp 64. Connected to this band or clamp 64 may be a loop 66 and a line 58. The clamp, loop, and line connections allow the lateral bladder 22 to be inverted within a space inside the launcher device 12. Generally, the lateral bladder 22 will be inverted along the ramp in the launcher device 12. Also connected to the launcher device 12 and lateral bladder 22 is a fluid line 56, which will be discussed in greater detail below.

Figure 4:
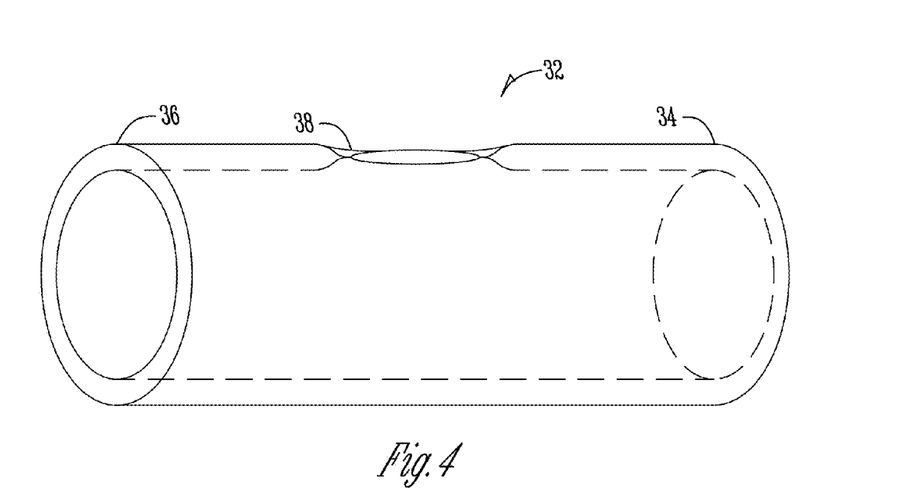
FIG. 4 is a perspective view of a main bladder used with embodiments of the present invention where two layers of material are fused together at an aperture.

Shown in FIG. 3 to be at least partially surrounding the launcher device 12 and flange portion 54 of the lateral bladder 22 is a main bladder 32. The main bladder 32 comprises two layers of expandable material having a generally tubular shape with a first end 34, a second end 36, and a main bladder opening 38 there between. The two layers of expandable material are fused together around the main bladder opening 38 such that the two layers form a barrier which is air or fluid impermeable, as illustrated in FIG. 4. The main bladder opening 38 corresponds to the opening 18 in the launcher device. The first end 34 of the main bladder 32 is secured at the open end 14 of the launcher device such that the first end 34 is air tight. The second end 36 of the main bladder 32 is then secured at the closed end 16 of the launcher device 12 in such a way that the second end 36 of the main bladder 32 is air tight as well. A port 60 (see also FIGS. 2a and 2b) is included in the launcher device 12 to provide a second fluid source to inflate the main bladder. When the main bladder 32 is inflated, the fluid within the two layers of expandable material creates a pillow that secures the launcher device 12 to the main pipe, and optionally seals the lateral connect 26 to the launcher device 12.

One of the objects of this invention is to provide independent inflation of the main bladder 32 and lateral bladder 22 by connecting the lateral bladder 22 to the launcher device 12 without the need for the lateral bladder 22 to be connected to the main bladder 32. This is accomplished by providing a separate port 60 in the launcher device that provides for inflation of the main bladder 32. The port 60 may include a variety of means for providing fluid to the main bladder 32. The port 60 may comprise a pin or needle-like protrusion to provide inflation, as the inner layer of bladder material could be punctured by the protrusion. Alternatively, the port 60 could simply be a hole that aligns with an opening on the inner layer of the main bladder 32. Another embodiment includes placing a Schrader valve on the inner layer of the main bladder 32 and attaching it to port 60, providing a controlled, independent inflation of the main bladder 32, even if a single source of fluid is used. In a first embodiment, the fluid to provide inflation is provided by a single air hose 56 to the launcher device 12. In another embodiment, a second air hose (not shown) is used with the launcher device 12. The first air hose provides inflation means for the main bladder 32 by attaching to the port 60 within the launcher device, and a second air hose provides a separate inflation means for the lateral bladder 22 by attaching to the open end 14 of the launcher device 12.

Figure 5:
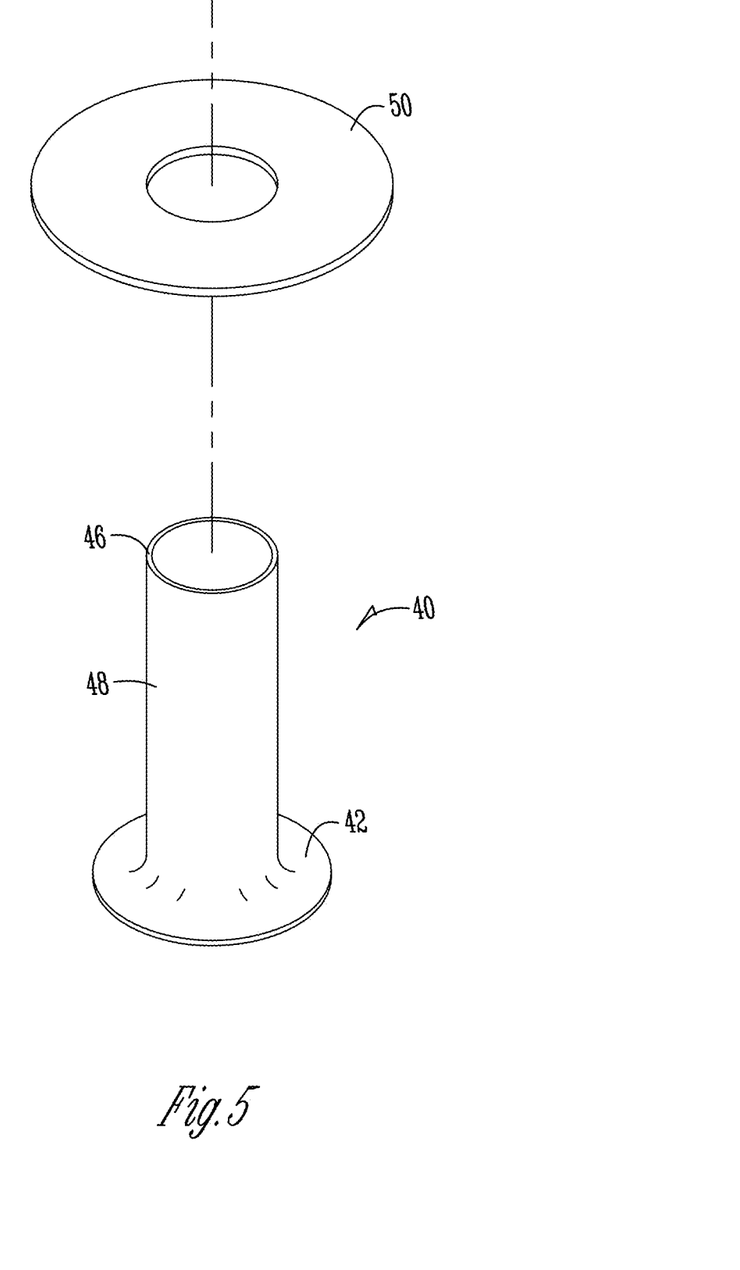
FIG. 5 is a view of an embodiment of a lateral liner and gasket used with the present invention.

FIG. 5 is a view of an alternative embodiment of a lateral liner 40. The lateral liner 40 is formed from a rectangular sheet of resin absorbent material. The bulk material is cut to form the desired length and width of the rectangle. The rectangle may then be rolled into a tubular shape by overlapping the edges of the rectangle. Alternatively, the edges of the rectangle may be stitched or fused together to form a tube. In either alternative, the lateral liner 40 should be in a tubular shape after expansion of the bladder and setting of a curable resin. It should further be appreciated that the liner material may have a resin impermeable coating on one side, but that is not a necessity.

The lateral liner 40 should include an anchor point to either the lateral bladder 22 or to the pipe junction. The anchor point serves to immobilize the lateral liner 40 after it is loaded onto the launcher device 12 and assures accurate placement of the lateral liner 40 within the pipes to be repaired. For applications where the lateral liner 40 is used for a repair solely within a lateral pipe, the anchor point may be provided by frangibly connecting the lateral liner 40 to the lateral bladder 22 by the use of an adhesive or solvent. Once the lateral liner 40 is installed within the lateral pipe and the resinous material has cured, the lateral bladder 22 is removed. When the lateral bladder 22 is removed, the frangible connection is broken and the liner is left within the pipe. For applications where the liner assembly is used to repair the junction of a main and lateral pipe, an anchor point for the lateral liner 40 may be provided by the use of a main liner member attached to an end of the lateral liner 40. Such an anchor point may be created by connecting the lateral liner 40 to a sheet of liner material cut to fit at least partially within the main pipe to be repaired. Another way to provide such an anchor point is to flare a portion of the lateral liner 40 after placing it into a tubular shape. The flared portion of lateral liner 40 is configured to fit at least partially within the main pipe to be repaired.

FIG. 5 illustrates an embodiment where a gasket 50 is included with the lateral liner 40. To attach the gasket 50 to the lateral liner 40, the lateral liner 40 is placed on a table with a first end 42 spread out to form a flared portion. A circular gasket 50 (shown in plan view in FIG. 5) having an aperture through the center of it is then placed over the second end 46 of the lateral liner 40 along the lateral liner body 48 and is placed adjacent the flared portion of the first end 42 of the lateral liner 40. The gasket 50 and the lateral liner 40 are then optionally secured together by either stitching the gasket 50 to the lateral liner 40 or fusing the gasket 50 to the liner body 48. If the gasket 50 is attached or fused to the lateral liner 40, the gasket 50 may serve as an anchor point. While the lateral liner 40 is generally comprised of a resin absorbent material, the gasket 50 may be comprised of a hydrophilic material which is capable of expanding in the presence of water. The gasket 50 may also be a rubber material as well.

Figure 6:
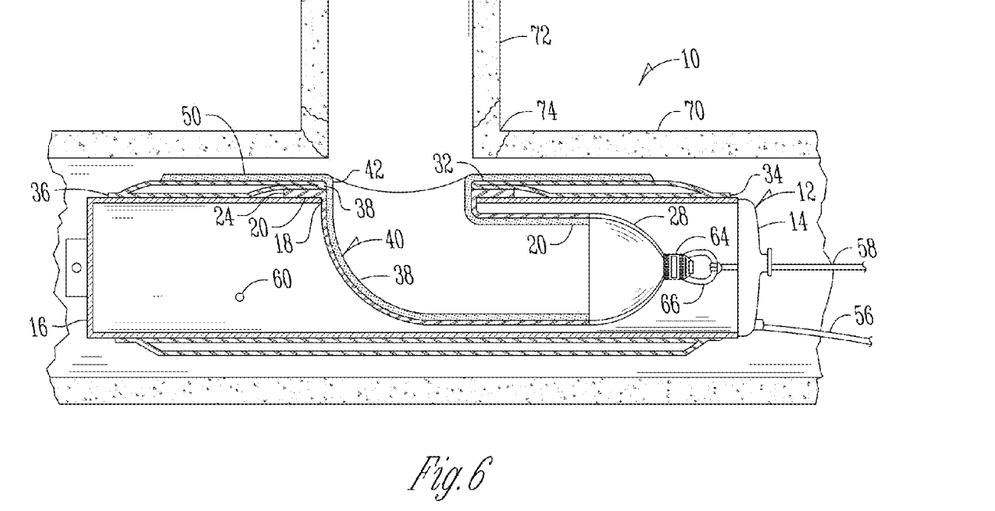
FIG. 6 is a view similar to FIG. 3 showing a first embodiment of the invention where the lateral liner is included with the liner assembly at the junction of the main and lateral pipe.

FIG. 6 is a view similar to FIG. 3 showing the lateral liner 40 and gasket 50 also included with the liner assembly 10 at the junction 74 of the main pipe 70 and lateral pipe 72. The lateral liner 40 is resin saturated with a resinous material capable of curing and hardening, and then drawn into the lateral bladder 22 as shown in FIG. 6. To do so, holes may be placed through the second end 46 of the lateral liner 40. A rope or line is inserted through the holes and then inserted through the inverted lateral bladder 22 in the launcher device 12. The rope or line is pulled to invert the lateral liner 40 into the inverted lateral bladder 22. Pulling the lateral liner 40 into the lateral bladder 22 inverts the lateral liner 40 within the lateral bladder 22. The rope or line is then removed from the second end 46 of the lateral liner 40, the lateral bladder 22 is clamped closed, and the open end 14 of the launcher device 12 is closed. Alternatively, the lateral liner 40 may be placed within a lateral bladder 22 that has already been clamped closed, which will be described in further detail below. In this position, if the lateral liner 40 has a coated side, the coated side of the lateral liner 40 will be next to the body 30 of the lateral bladder 22 and the non-coated side of the lateral liner 40 will be facing inwards. The liner assembly 10 is now ready to be positioned in a main pipe 70 adjacent a lateral pipe 72.

The liner assembly 10 is pulled or pushed through a main pipe 70 to be positioned adjacent a lateral pipe 72. A line may be connected to the launcher device 12 and liner assembly 10 to pull the device, or a positioning robot (not shown) may be used to position the liner assembly 10 within the main pipe 70. FIG. 6 shows the correct positioning of the liner assembly 10 within a main pipe 70 such that the opening 18 of the launcher device 12 is directly adjacent the opening of the lateral pipe 72.

Figure 7:
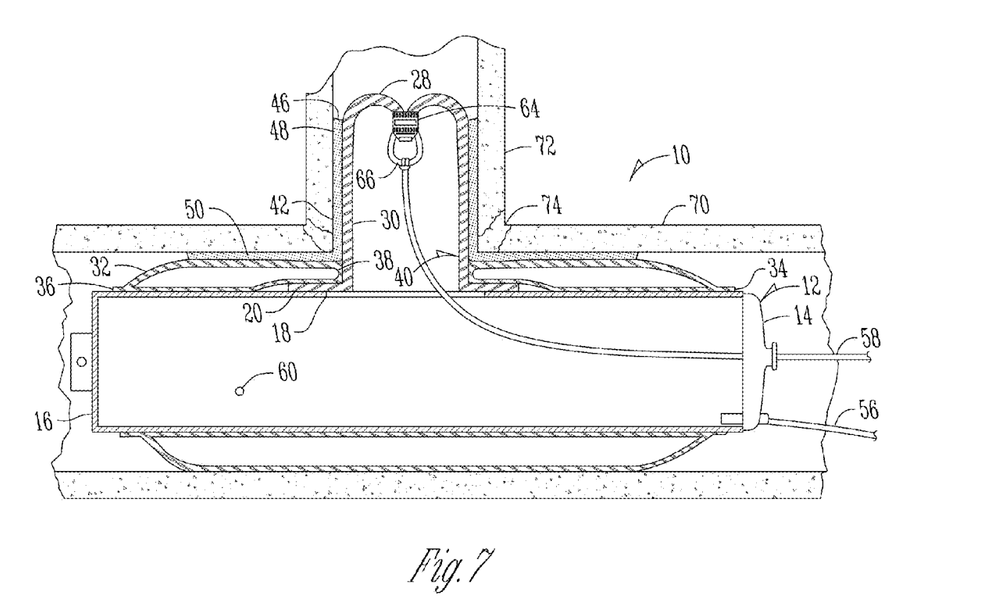
FIG. 7 is a view similar to FIG. 6 showing the liner assembly inflated and pressing the lateral liner against the lateral pipe and the junction.

FIG. 7 is a view similar to FIG. 6 showing the liner assembly 10 inflated in the main pipe 70 and lateral pipe 72 with the lateral liner 40 pressed against the lateral pipe 72 and the junction 74. Air, or another fluid, is added to the main bladder 32 and the lateral bladder 22. The fluid may be added by a fluid line 56 and a port 60. However, it should be noted that the lateral bladder 22 and main bladder 32 are separately inflated in this embodiment, as previously described. The inflation of the lateral bladder 22 will cause the lateral bladder 22 and the lateral liner 40 to evert through the opening 18 of the launcher device 12 and into the lateral pipe 72. The evertion causes the non-coated side of the lateral liner 40 to be pressed against the wall of the lateral pipe 72. In addition, the main bladder 32 is inflated to press the gasket 50 or collar portion of the lateral liner 40 against the junction 74 between the main pipe 70 and lateral pipe 72. Because the main bladder 32 includes a main bladder opening 38, the lateral bladder 22 and lateral liner 40 are able to evert through the opening 18 and into the lateral pipe 72. The inflation is maintained until the resinous material, which has been saturated into the lateral liner 40, has been allowed to cure and harden. At this point, the fluid is removed and the lateral bladder 22 must be removed from the lateral pipe 72.

The lateral bladder 22 is removed by pulling a line 58 connected to a loop 66 at the second end 28 of the lateral bladder 22, which peels the lateral bladder 22 away from the lateral liner 40. Thus, the lateral liner 40 remains in the lateral pipe 72 providing a repaired wall of the lateral pipe 72. Likewise, the main bladder 32 is deflated to leave the hydrophilic gasket 50 at the junction 74 between the main pipe 70 and lateral pipe 72. The hydrophilic gasket 50 helps seal the junction 74 from water by expanding in the presence of water to block the flow of water behind the gasket 50, which could increase the damage at the junction 74 between the main pipe 70 and lateral pipe 72. Once the lateral bladder 22 has been reinverted into the launcher device 12 and the main bladder 32 has been deflated, the launcher device 12 may be removed from the main pipe 70.

Figure 8:
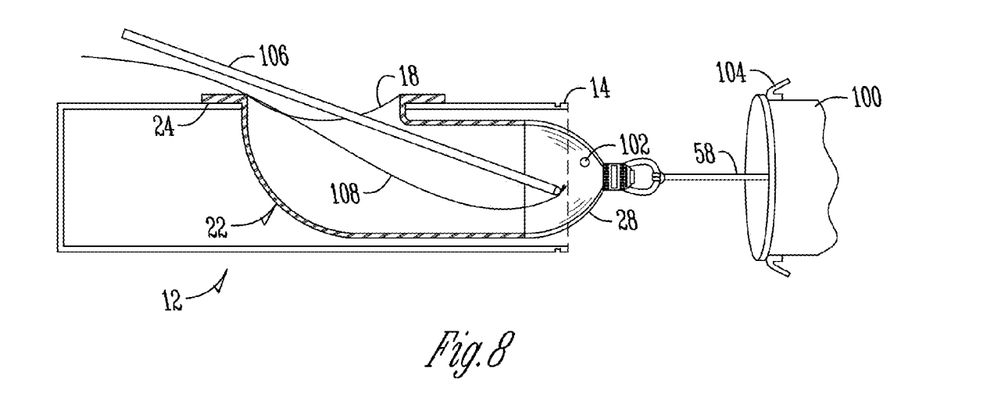
FIG. 8 is a sectional view showing a second embodiment of the present invention configured for rapid reuse.

FIG. 8 is a second embodiment according to the invention configured for rapid reuse. The configuration is similar to the one depicted in FIG. 3, with two main alterations. First, the use of a lay flat hose 100 is depicted. If the length of the lateral pipe to be repaired is longer than the length of the launcher device 12, a lay flat hose 100 may be included with the liner assembly to accommodate longer lengths of lateral bladder and lateral liner. The lay flat hose 100 is connected to the open end 14 of the launcher device 12. The lay flat hose allows an additional length of lateral liner 40 (not shown) and lateral bladder 22 to be inverted through the opening 18 of the launcher device 12. It should be noted that the use of the lay flat hose 100 is optional and does not affect the method of inflating and everting the lateral bladder 22 and lateral liner into the lateral pipe. In the embodiment depicted in FIG. 8, the launcher device 12 is connected to the lay flat hose 100 by the use of a sealing mechanism. The sealing mechanism for the lay flat hose 100 may be a cam lock 104 or other mechanism that is capable of releasably attaching the lay flat hose 100 to the launcher device 12. Such a mechanism should allow for a quick and easy release from the launcher device 12, allowing for easy access and rapid reloading of the lateral bladder 22.

A second alteration of the embodiment illustrated in FIG. 8 is that an opening 102 is inserted into the second end 28 of the lateral bladder 22. The primary role of the opening 102 is to provide a means to load a new lateral liner into the same lateral bladder 22 by allowing a rope 108 or line to be received by a technician to place a new lateral liner within the lateral bladder 22. After the new lateral liner is loaded, the opening 102 may remain open to act as a steam exhaust port for applications where the resin is cured by steam. In applications where an ambient cure resin is employed, a blocking member may be placed over the opening 102. The blocking member may be any member that is capable of temporarily blocking the opening 102. For example, the blocking member could be duct tape. When the lateral bladder 22 is everted into the lateral pipe, the blocking member will be on the interior of the lateral bladder 22 and the pressure of the fluid on the interior of the lateral bladder 22 will act to keep the blocking member in place.

In operation, a first lateral liner is installed into a lateral pipe as described in relation to FIGS. 1-7. The lateral bladder 22 is removed from a first lateral pipe and is pulled and inverted through the opening 18 of the launcher device 12. The lateral bladder 22 is long enough to extend into the lay flat hose 100. The lay flat hose 100 is disconnected from the launcher device 12 by use of cam-locks 104. The lay flat hose 100 is removed, exposing the lateral bladder 22. A rod 106 including a rope 108 is inserted into the lateral bladder 22 at the opening 18 of the launcher device 12, and extends to the second end 28 of the lateral bladder 22 so that the rope 108 passes through the opening 102 in the second end 28 of the lateral bladder 22. A new lateral liner soaked in a resinous material may now be pulled into the lateral bladder 22 using the rope 108. Alternatively, the rope 108 may be doubled and attached to the new lateral liner by a hole in the new lateral liner. The new lateral liner may then be loaded in the same manner as described in relation to FIG. 6. In such an embodiment, the rope 108 is threaded through a hole in the new lateral liner, the new lateral liner is placed into the lateral bladder 22, and both ends of the rope 108 are pushed toward opening 102 by the rod 106. The new lateral liner is secured and pulled into place by a technician. Once the new lateral liner is in place, one end of the rope 108 is released, and the other end of the rope 108 is pulled through the hole in the new lateral liner and through the opening 102 in the lateral bladder 22. The new lateral liner is now in place. The opening 102 is optionally closed with a blocking member, the lay flat hose 100 is connected to the launcher device 12, the new liner assembly is positioned within a main pipe for deployment, the main bladder and the lateral bladder 22 are inflated with a fluid, the lateral bladder 22 and new lateral liner are inverted into a second lateral pipe, and the resinous material is allowed to cure and harden. The fluid is removed from the lateral bladder 22, the lateral bladder 22 is removed from the second lateral pipe using line 58, and the process may be repeated.

The embodiment depicted in FIG. 8 provides a method and apparatus where the lateral bladder 22 remains intact, unchanged, and attached to the launcher device 12. Therefore, a new lateral liner may be quickly reloaded into the launcher device 12. Since no changes to the assembly were required after the placement of a first lateral liner, a plurality of lateral liners may be rapidly installed into a plurality of lateral pipes using the same lateral bladder 22.

Figure 9:
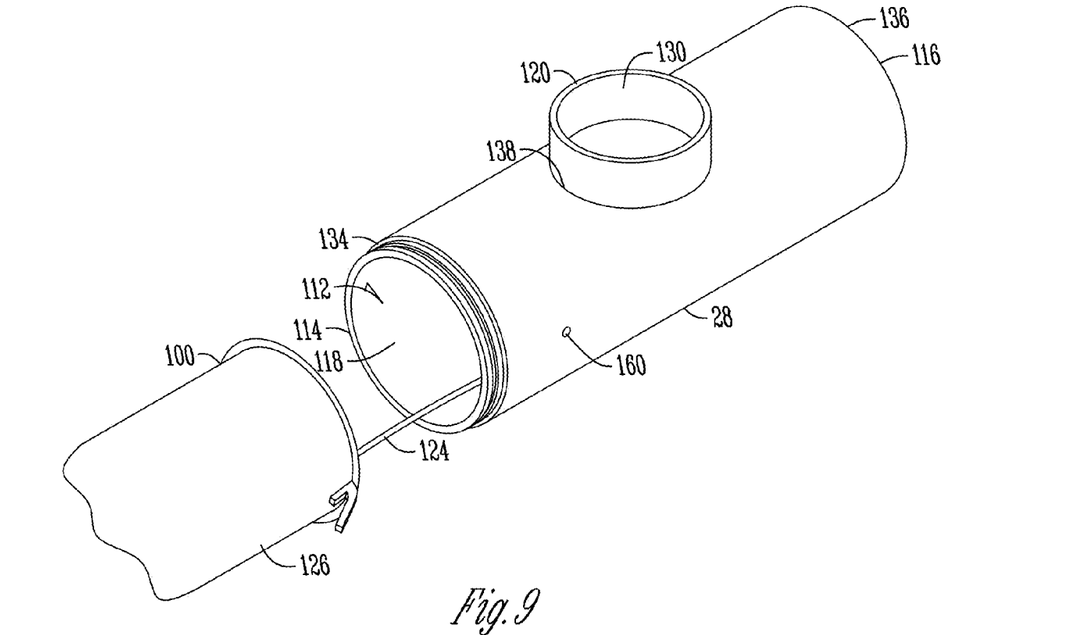
FIG. 9 is a perspective view of a third embodiment of the invention, illustrating a launcher device having a protruding collar and a main bladder attached.
Figure 10:
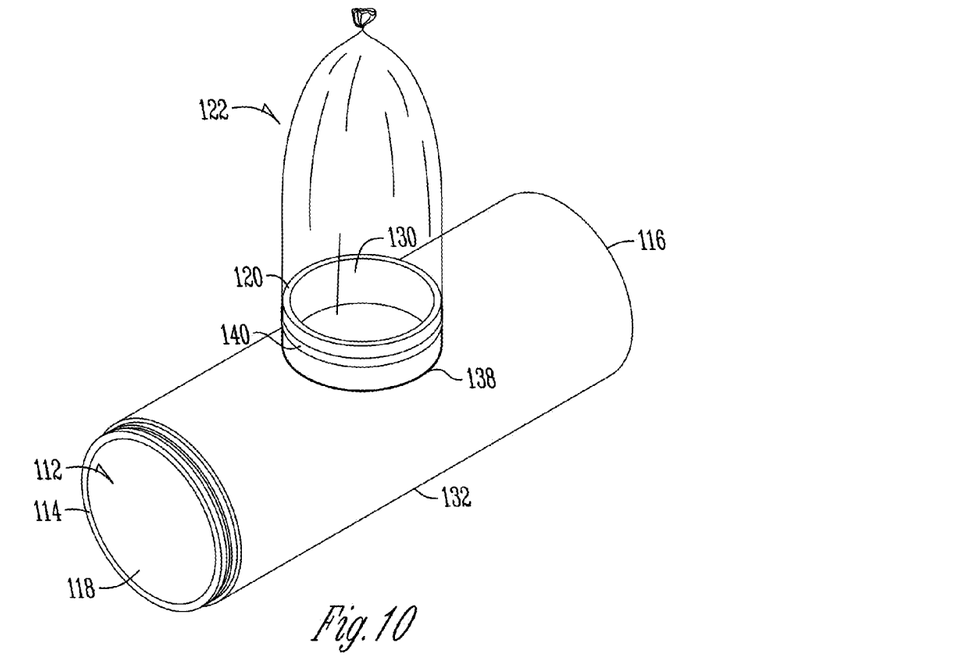
FIG. 10 is a perspective view of the third embodiment showing a lateral bladder attached to the exterior of the protruding collar of the launcher device.
Figure 11:
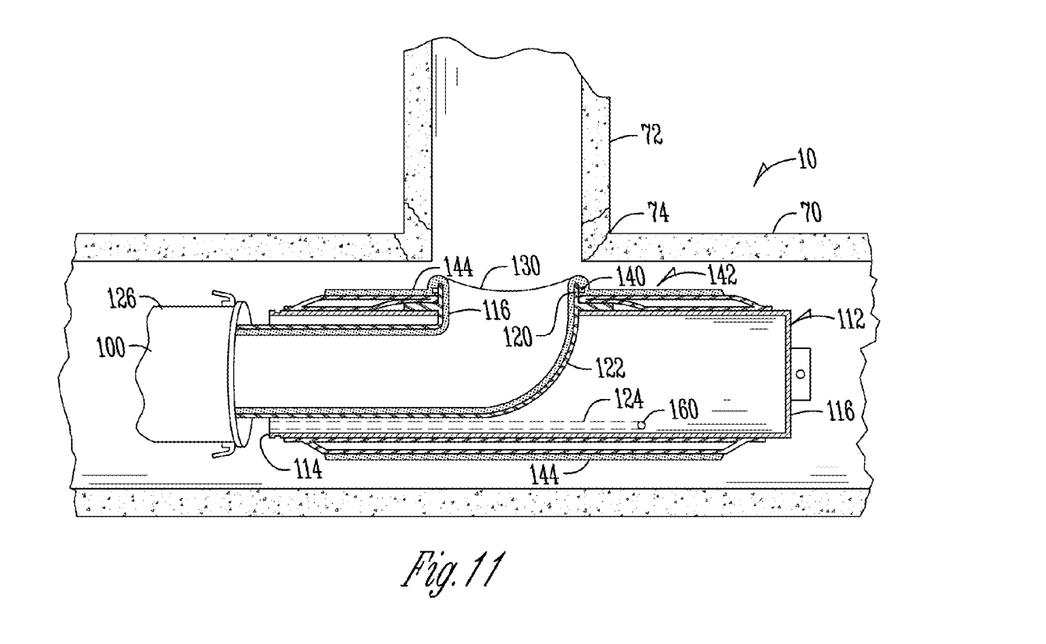
FIG. 11 is a sectional view of the third embodiment showing a liner included with the loaded launcher device at the junction of a main and lateral pipe.

FIGS. 9-11 depict a third embodiment according to the present invention where the lateral bladder 122 may be prepared at a remote location from the installation site, where the launcher device 112 includes a protruding collar 120, where the lateral bladder 122 is attached to the exterior of the collar 120 of the launcher device 112, and where the launcher device includes separate fluid sources 124, 126. This embodiment addresses deficiencies in the art where a two-bladder system is employed to repair either a junction of a main and lateral sewer pipe or a section of a lateral pipe.

FIG. 9 shows the launcher device 112, including a first launcher end 114, an opposite second launcher end 116, and a launcher device body 118 there between, and a collar 120 having an interior and an exterior protruding from an opening 130 on the launcher device body 118. FIG. 9 shows where a main bladder 132 has been placed onto the launcher device 112 and substantially surrounds the launcher device body 118. The main bladder 132 has a first main bladder end 134, an opposite second main bladder end 136, and a main bladder opening 138 there between, and the main bladder 132 is placed onto the launcher device 112 such that the collar 120 enters the main bladder opening 138. As in the previous embodiments, the main bladder 132 comprises two layers of expandable material having a generally tubular shape. The two layers of expandable material are fused together around the main bladder opening 138 such that the two layers form a barrier which is air or fluid impermeable, as illustrated in FIG. 4. The first main bladder end 134 is secured at the first launcher end 114 such that the connection is air tight. The main bladder end 136 is then secured at the second launcher end 116 in such a way that the connection is air tight as well. In this embodiment, the main bladder 132 can be unattached to the launcher device 112 at or near the main bladder opening 138. A lay flat hose 100 provides a fluid source 126 to the interior of the launcher device 112 once attached to the first launcher end 114. A port 160 and fluid source 124 are included in the launcher device 112 to provide a second fluid source to inflate the main bladder 132. When the main bladder 132 is inflated, the fluid within the two layers of expandable material creates a pillow that secures the launcher device 112 to the main pipe.

A lateral bladder 122 is attached to the launcher device, as illustrated in FIG. 10. FIG. 10 shows the lateral bladder 122 attached to the launcher device 112 at the exterior of the collar 120 by a band 140. Alternatively, lateral bladder 122 may be attached to the exterior of the collar 120 of the launcher device 112 by the use of a clamp, clip, adhesive, strap, screw, or other fastener. The lateral bladder may be produced at a location remote to the installation site, because the lateral bladder 122 should be made to easily fit the collar 120 of the launcher device 112. In cases where a flange portion is desired for lateral bladder 122, the flange portion may be attached to the lateral bladder 122 in the field or attached at a factory using heat welding, adhesives, or mechanical connections such as stitches. The flange portion could be folded over the band 140, attached to the launcher device body 118, or attached to the exterior of the protruding collar 120. In the illustrated embodiment, lateral bladder 122 comprises a one-piece tubular bladder. It should be noted that lateral bladder 122 has been attached to the launcher device 112 after main bladder 132 in the illustrated embodiment, but the lateral bladder 122 may be attached before main bladder 132. Once the main bladder 132 and lateral bladder 122 are attached to the launcher device 112, a liner 142 must be loaded onto the launcher device 112.

FIG. 11 is a sectional view of the third embodiment showing a liner 142 included with the launcher device 112 at the junction 74 of a main pipe 70 and lateral pipe 72. The liner 142 is shown to have a lateral portion 146 and a main line portion 144 which acts as an anchor point. Alternatively, the liner 142 may include other anchor points as discussed above. The liner 142 is saturated with a resinous material capable of curing and hardening and drawn onto or into the lateral bladder 122. The lateral bladder 122 may be inverted into launcher device body 118 to load the liner 142. The lateral portion 146 of liner 142 may be drawn into lateral bladder 122 until main line portion 144 sits on top of main bladder 132, remaining outside of launcher device body 118. The lay flat hose may then be attached to the first launcher end 114.

In operation, the loaded launcher device 122 is inserted into a main pipe 70 and the launcher device opening 130 is aligned with the opening of a lateral pipe 72 as previously described. The first fluid source 124 inflates the main bladder 132 with a fluid, pressing the main bladder 132 and main line portion 144 of liner 142 against the walls of the main pipe 70. A fluid is then provided by the second fluid source 126 to the interior of the launcher device body 118 to the lateral bladder 122, forcing the lateral bladder 122 to evert into the lateral pipe 72. Since the main line portion 144 of liner 142 has been pressed against the walls of the main pipe, lateral portion 146 of liner 142 is easily pressed against the walls of the lateral pipe 72 with minimal shifting or movement. The resinous material in the liner 142 is then allowed to cure and harden. Since lateral bladder 122 has been attached to the exterior of the collar 120 of the launcher device 112, there is minimal resin migration into the junction between the main bladder 132 and lateral bladder 122. After the resinous material has cured and hardened, the bladders 122, 132 are deflated, and the launcher device 112 is removed from the junction 74. This embodiment may be configured for rapid reuse, as in the second embodiment.

Embodiments according to the present invention allow a user to install any length and diameter of lateral liner to renew the wall of a lateral pipe and the junction between the lateral and main pipes. This is done by having a lateral bladder which can be quickly constructed at a job site by including a lateral connect to any diameter of a lateral bladder and sizing the length of lateral bladder as needed for the particular job. Because the main bladder will work with any size, it does not need to be constructed on site or connected to the lateral bladder. This will accommodate a wide range of pipe sizes needing repair. In addition, the main bladder will last for approximately 20 installs such that it will not have to be replaced on the launcher device. While the lateral bladder may need to be changed for each job, if a similar sized pipe diameter and length needs repair, a constructed lateral bladder is used for 3-5 installs providing the length is sufficient for all repairs. There are at least two advantages of utilizing the methods of this disclosure. First, the installer and customer will share a substantial cost savings because the assembly is reusable. Secondly, productivity will be increased as the reusable liner assembly may be constructed, loaded, and/or reloaded in a short amount of time.

What is claimed is:

1. An assembly for repairing a pipe, comprising:
a launcher device comprising a first launcher end, an opposite second launcher end, and a rigid launcher device body there between;
a launcher device opening disposed on the launcher device body;
a main bladder substantially surrounding the launcher device body;
the main bladder having a first main bladder end secured at the first launcher end, an opposite second main bladder end secured at the second launcher end, and a main bladder opening there between;
wherein the main bladder opening substantially aligns with the launcher device opening;
a lateral bladder comprising a tubular lateral bladder body portion and a lateral connect, the lateral connect having a flange portion and a tubular portion, wherein the flange portion is attached to an exterior of the launcher device body and the tubular portion is inserted within the lateral bladder body portion such that the lateral bladder is fluidly sealed to the launcher device separate than the main bladder;
a first port in fluid communication with the main bladder for inflating the main bladder and a second port in fluid communication with the lateral bladder for inflating the lateral bladder, wherein the first port allows controlled inflation of the main bladder independent from inflation of the lateral bladder through the second port; and
a liner comprising an absorbent material.

2. The assembly of claim 1, wherein the liner further comprises a main liner member connected to a lateral member; and wherein the lateral member is disposed within the lateral bladder.

3. The assembly of claim 2, wherein the main liner member remains outside of the launcher device body while the lateral member is disposed within the lateral bladder.

4. The assembly of claim 1, wherein the main bladder is unattached to the lateral bladder.

5. The assembly of claim 1, wherein the main bladder is not attached to the launcher device body at or around the launcher device opening.

6. The assembly of claim 1, further comprising providing a first fluid source connected to the main bladder and a second fluid source connected to the lateral bladder.

7. The assembly of claim 1, wherein the lateral bladder is attached to the exterior of the launcher device body by a band, a clip, an adhesive, a screw, or a retaining ring.

8. The assembly of claim 1, wherein the liner is a sheet.

9. The assembly of claim 8, wherein the liner is formed into a tube.

10. The assembly of claim 1, wherein the flange portion is attached to the exterior of the launcher device body at the launcher device opening.

11. The assembly of claim 1, wherein the flange portion is attached to the exterior of the launcher device body at the first or second launcher end.

12. The assembly of claim 11, wherein the lateral bladder is attached to the exterior of the launcher device body by a band, a tape, a clip, an adhesive, a cam lock, a retaining ring, or a hose.

13. A method of repairing a pipe, comprising:
providing the assembly of claim 1;
placing the lateral bladder within the launcher device body;
impregnating the liner with a resinous material capable of curing and hardening;
inserting at least a portion of the liner into the lateral bladder;
inflating the main bladder by forcing fluid through a first port;
inflating the lateral bladder by forcing fluid through a second port, forcing the lateral bladder and at least the portion of the liner through the launcher device opening and the main bladder opening, pressing the liner against the pipe;
wherein the first port provides inflation of the main bladder independent from inflation of the lateral bladder through the second port; and
allowing the resinous material capable of curing and hardening to cure and harden.

14. The method of claim 13, wherein the pipe to be repaired includes a junction between a main pipe and a lateral pipe; wherein the liner comprises a main line member connected to a lateral member; wherein the lateral member of the liner is the portion of the liner inserted into the lateral bladder; and wherein the main line member remains outside of the launcher device body while the lateral member is inserted into the lateral bladder.

15. The method of claim 14, wherein the lateral member is drawn inside the lateral bladder until the main line member is seated onto the main bladder.

16. The method of claim 14, further comprising pressing the main line member against the main pipe.

17. The method of claim 13, wherein the main bladder is unattached to the lateral bladder.

18. The method of claim 13, wherein the main bladder is not attached to the launcher device body at or around the launcher device opening.

19. The method of claim 13, further comprising:
inflating the main bladder with a first fluid source; and
inflating the lateral bladder with a second fluid source.

20. The method of claim 13, wherein the lateral bladder is attached to the exterior of the launcher device body by a band; a clip, an adhesive, a screw, or a retaining ring.

21. The method of claim 13, wherein the liner is a sheet.

22. The method of claim 21, further comprising placing the liner into the form of a tube.

23. An assembly for repairing a pipe, comprising:
- a launcher device comprising a first launcher end, an opposite second launcher end, and a rigid launcher device body there between;
- a launcher device opening disposed on the launcher device body;
- a main bladder substantially surrounding the launcher device body;
- the main bladder having a first main bladder end, an opposite second main bladder end, and a main bladder opening there between;
- wherein the main bladder opening substantially aligns with the launcher device opening;
- a first opening in the launcher device in fluid communication with the main bladder for providing inflation of the main bladder;
- a lateral bladder comprising a tubular lateral bladder body portion and a lateral connect, the lateral connect having a flange portion and a tubular portion, wherein the flange portion is attached to an exterior of the launcher device body and the tubular portion is inserted within the lateral bladder body portion such that the lateral bladder is fluidly sealed to the launcher device separate than the main bladder;
- a second opening in the launcher device in fluid communication with the lateral bladder and for providing inflation of the lateral bladder; and
- a liner comprising an absorbent material;
- wherein the first opening provides inflation of the main bladder independent from inflation of the lateral bladder through the second opening.

24. The assembly of claim 23 wherein the first opening and the second opening are fluidly combined with a single source of fluid.

* * * * *